US008271003B1

(12) United States Patent  (10) Patent No.: US 8,271,003 B1
Othmer et al.  (45) Date of Patent: Sep. 18, 2012

(54) DISPLAYING VISUAL REPRESENTATION OF VOICE MESSAGES

(75) Inventors: Konstantin Othmer, Mountain View, CA (US); Albert Jordan, Menlo Park, CA (US)

(73) Assignee: Smith Micro Software, Inc, Aliso Viejo, CA (US)

( * ) Notice: Subject to any disclaimer, the term of this patent is extended or adjusted under 35 U.S.C. 154(b) by 696 days.

(21) Appl. No.: 11/690,744

(22) Filed: Mar. 23, 2007

(51) Int. Cl.
*H04W 4/00* (2009.01)
*H04M 1/725* (2006.01)

(52) U.S. Cl. .............. 455/466; 455/412.2; 370/328; 370/338

(58) Field of Classification Search .............. 455/466
See application file for complete search history.

(56) References Cited

U.S. PATENT DOCUMENTS

| | | | |
|---|---|---|---|
| 7,103,154 B1* | 9/2006 | Cannon et al. | 379/67.1 |
| 7,903,794 B1* | 3/2011 | Bales et al. | 379/88.11 |
| 2002/0091829 A1* | 7/2002 | Wood et al. | 709/227 |
| 2002/0128831 A1* | 9/2002 | Ju et al. | 704/231 |
| 2002/0141548 A1* | 10/2002 | Boda | 379/88.01 |
| 2002/0173955 A1* | 11/2002 | Reich | 704/231 |
| 2003/0078083 A1* | 4/2003 | Meador | 455/575 |
| 2004/0121761 A1* | 6/2004 | Tripathy et al. | 455/413 |
| 2005/0125220 A1* | 6/2005 | Kim | 704/10 |
| 2005/0163289 A1* | 7/2005 | Caspi et al. | 379/88.13 |
| 2006/0013366 A1* | 1/2006 | Gilbert | 379/67.1 |
| 2007/0005368 A1* | 1/2007 | Chutorash et al. | 704/275 |
| 2007/0118662 A1* | 5/2007 | Vishwanathan et al. | 709/227 |

* cited by examiner

*Primary Examiner* — Lester Kincaid
*Assistant Examiner* — Andy Gu
(74) *Attorney, Agent, or Firm* — Workman Nydegger (57) ABSTRACT

Messages, such as voice messages, are received at a server and processed to generate extracted data that includes text from the message, envelope information, or contact information. The extracted data is transmitted to a device that displays a visual representation that includes some of the extracted data. The visual representation (e.g., an icon) enables the user to visually see what is in a voice message. By selecting a particular visual representation, the corresponding message can be retrieved from the message server and played at the device. In some instances, the message server also transmits an initial segment to the device that can be played by the device as well.

6 Claims, 6 Drawing Sheets

Fig. 5

DISPLAYING VISUAL REPRESENTATION OF VOICE MESSAGES

CROSS REFERENCE TO RELATED APPLICATIONS

Not Applicable.

BACKGROUND OF THE INVENTION

1. The Field of the Invention

The present invention relates generally to voice message systems. More particularly, embodiments of the invention relate to systems and methods for delivering voice messages by providing a visual or audible representation of each message to a user that enables a user to directly access a voice message.

2. The Relevant Technology

Subscribers of voice messaging services typically receive visual notifications of new messages waiting on their communication device. These notifications are often limited to an indication of the number of messages that are waiting in a subscriber's inbox. The subscriber may be entirely unaware of who sent the message, when it was sent, and in particular, what the message is about.

Furthermore, listening to and learning the content of a voice message often requires establishing a network connection to the message server, a process which can take several seconds or more to complete, and which often requires navigating through the message server's menu before finally being able to listen to a message. In addition, the use of a conventional voice mail system requires the user to access his or her messages sequentially in the order they were received. Even when a user is listening to previously played and/or saved messages, the user is typically required to skip messages until the desired message is located. Also, conventional voice mail systems do not provide a way for users to determine what a message is about or even who it is from until the content of each message is played. Thus, in order to reach and play a desired message, the user may be required to listen to a part of every received message in the queue prior to reaching the desired message.

One solution to the lack of instantaneous access to voice messages is to automatically deliver each message in its entirety to a communication device while connected with a communication network, as can be done with Multimedia Messaging Service (MMS) messages. For example, when an MMS message is created using an MMS client, it is submitted to a home MMS Center (MMSC), and then sent by the home MMSC to the recipient MMSC. The recipient MMSC sends a notification to the recipient's wireless device, and the MIMS client on the recipient's wireless device automatically retrieves the MMS message from the recipient MMSC after receiving the notification. MMS voice messages, besides being delivered automatically, have the additional advantage of being stored locally on both the sending and receiving wireless device so that either the sender or the receiver can forward the voice message to other devices and have instant access to the voice message as long as the message is stored on the users' device.

Automatically delivering each message eliminates any need to establish a network connection after the recipient device alerts the recipient to the receipt of the message, because the message has already been stored locally. However, communication devices have limited storage capacity, so the automatic delivery and local storage of numerous voice messages, whether voice mail messages or MIMS messages, is limited by the storage capacity of the wireless device.

Further, MMS systems do not address the issues related to the fact that different voice mail systems typically have varying capabilities. For example, people often have multiple voice mail systems (e.g., home voice mail, work voice mail, cellular voice mail, etc.), and the ability to listen to messages on a particular voice mail system requires the user to call in to that specific system and then navigate the menu system of that system in order to retrieve any voice mail messages stored therein. A person who has multiple voice mail systems is typically unable to retrieve all messages from multiple systems simultaneously, but is required to access each system independently. Furthermore, even if the user's voice mail systems forward the messages to a single messaging system, the user is still required to navigate menus and can only access the voice messages sequentially, in the order they were received. As a result, the user may spend substantial time looking for specific messages and is often unaware of the content of those messages until they are located in the queue and played.

Accordingly, there currently exists a need in the art for improving voice message systems and providing more information about received voice messages to users.

BRIEF SUMMARY OF THE INVENTION

The present invention is generally directed to systems and methods for managing voice messages and, in particular to delivering visual or audio data associated with voice messages. According to one aspect of the invention, voice messages including multimedia messaging service (MMS) messages are represented visually on a communication device using a thumbnail icon or other visual representation, a subject line including text extracted from the message, and/or other information regarding attributes of the message, such as identification of the sender of the message.

One embodiment of the invention enables a device, such as a wireless cellular device, to become an inbox for all messages that are received by a user's various voice message systems. A message server interacts with the user's voice message systems to receive or to collect the user's voice messages. The message server then processes the various messages to extract data that represents the message and that can be visually and/or audibly rendered on the user's device. The extracted data is then sent to the device. The device then displays at least a portion of the extracted data to give the user an idea of the content of the message.

Advantageously, the user can know or be apprised of the content of the voice message by viewing a textual representation of the transcoded message without having to call in to a particular voice message system and without navigating any type of conventional voice message menu system. Further, the user can access the message immediately and in a non-sequential manner with regard to other messages received by the user.

When the user receives the extracted data that is to be displayed on the user's device, the extracted data is often accompanied by or includes an initial segment of the voice message. Receiving a short segment conserves memory on the user's device and also allows the user to listen to at least a portion of the message. The initial segment can be any portion of the original message (e.g., a beginning segment, a segment from the middle of the message, etc.).

When the user selects an icon, text string or other representation of the voice message, the device can then fetch the rest of the message from the message server. In one embodiment, this process may occur in a manner that permits the device to play back the message as if it were completely stored on the user's device. Thus, the device begins playing the stored segment and then continues to play the fetched message at the point where the segment ends. Alternatively, the message can be streamed to the device or played in any other manner.

As indicated above, the visual representations of the voice messages enable a user to access any message from any of the user's voicemail systems in any order and without requiring menu navigation of a network resident voicemail system via spoken word or touch-tones or other mechanism. Further, the visual representation of a message often includes text that apprises the user of the content of the message. The text may be generated by a voice-to-text module and the words included in the text can correspond to the audio segment delivered to the device, or they may be key words that are recognized with confidence by the voice-to-text module, and the like or any combination thereof.

According to another aspect of the invention, an initial segment of a voice message and a reference pointing to the complete voice message stored on a message server are delivered from the message server to a communication device. A user selects the initial segment of the message stored on the communication device and playback begins immediately. During playback of the initial segment, the communication device establishes a connection with the message server and uses the reference associated with the initial segment to issue a request to the message server to begin transmitting the remaining portion of the voice message to the communication device. In this way, once the initial (stored) segment of the message is complete, the remaining (just transmitted) portion of the message can be played, and the message playback continues uninterrupted. In one embodiment of the invention, the initial segment delivered to the communication device is five to ten seconds long, and can generally be any time sufficient to mask the latency of establishing a communication session between the device and the voice server to begin streaming of the rest of the message.

Embodiments of the invention for delivering an initial segment of a voice message and a reference pointing to the complete voice message can be used in conjunction with wireless communication devices as well as land line devices.

According to another aspect of the invention, a device can manage the stored messages in a manner that maximizes the number of messages that can be stored or accessed via the device as described herein. For example, a voice message originally stored in its entirety on a communication device and backed up in a remote memory location or on a voice server is repeatedly truncated on the communication device as the period of time that the message has been stored on the communication device increases. In one embodiment of the invention, the message on the communication device is truncated until it has been completely deleted and all that remains of it is a stored reference pointing to the backup copy of the message in the remote memory location or voice server. In another embodiment of the invention, the message backed up in a remote memory location or on a voice server and stored on the communication device is truncated until only an initial segment of it remains, along with a stored reference pointing to the complete backup copy of the message in the remote memory location. Truncating older voice messages enables memory on the device to be freed for newer messages. The scheme used for truncating messages or for deleting messages is not limited to age, but can also be configured according to sender or any other user-selected criteria.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The present invention relates to voice messaging systems. More particularly, embodiments of the invention relate to the delivery of voice messages. Embodiments of the invention enable a device, such as a cellular telephone, to serve as an inbox that includes messages from as many as all of the user's other voice message systems. The device can be used to create and access messages substantially instantaneously. Embodiments of the invention can also eliminate the need to independently access each of multiple voice message systems, as well as the requirement of navigating through voice message menu systems.

A message server interacts with the user's voice message systems and fetches the voice messages or segments of the voice messages from those systems. Once the voice messages or message segments have been fetched from the various voice message systems, the message server then interacts with the user's device to make the device aware of the accumulated voice messages. This is done, for example, by pushing data to the device, in which the data corresponds to particular voice messages and can be visually displayed on the device. The data not only visually represents the corresponding voice messages (or other types of messages, including MMS messages) from various messaging systems, but it may also include information regarding the content of the messages. Further, the visual representation of the data ensures that the user can access the voice messages in a non-sequential manner. The user can simply select an icon, text string (or other visual representation) and the corresponding voice message is played at the user's device. In one embodiment, the message can be played as if the entire message were stored on the user's device in instances where only a portion of the message is actually stored on the user's device.

Embodiments of the invention are therefore directed to message systems and, in particular, to systems and methods for managing messages using a single device, including delivering voice messages from multiple message systems using a single interaction on a single device interface. While embodiments of the invention are described in the context of voice messages, one of skill in the art can appreciate that embodiments of the invention also apply to other types of messages that are delivered over various networks. Examples include, instant voice messages (i.e., voice messages that are created and sent without initiating a telephone call to the recipient), MIMS messages, SMS messages, and the like, or any combination thereof.

Figure 1:
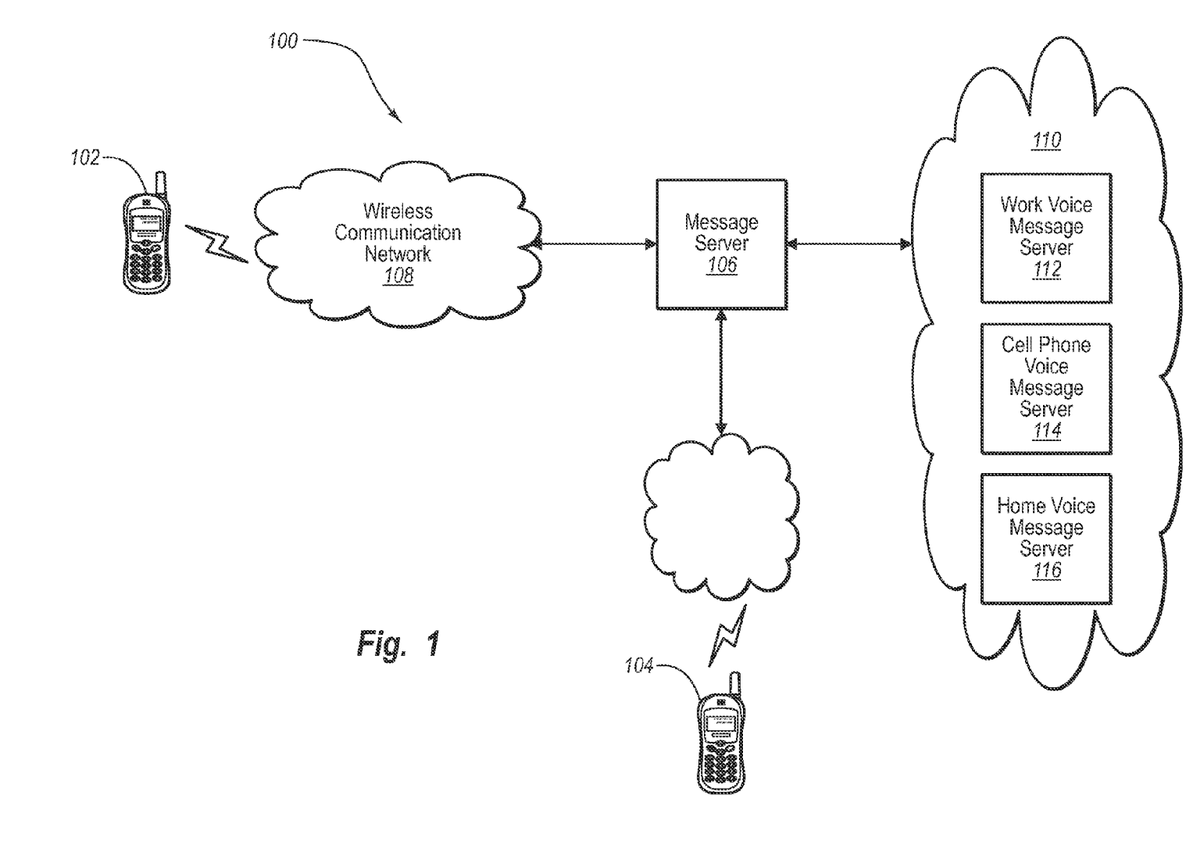
FIG. 1 illustrates one embodiment of a communications network over which voice messages can be sent and received.

FIG. 1 is a block diagram illustrating an exemplary communication system in which embodiments of the invention can be practiced. Wireless communication system 100 includes a communication device 102 that can be used to create, transmit and receive messages including voice messages. Messages may be transmitted to or received from a wireless device 104 and in general to or from any device capable of receiving or sending such messages. For example, messages may be transmitted to or from a device over a Public Switched Telephone Network (PSTN), over an Internet Protocol (IP) Network, over a wireless RF network, and the like or any combination thereof. Communication device 102 can be a wireless or mobile telephone, a conventional wired telephone, a Personal Digital Assistant (PDA), a laptop computer, or any other device able to communicate over a network.

In the embodiment of FIG. 1, communication device 102 communicates with a message server 106 through network 108, which may be a wireless network, a PSTN, a wired/wireless IP based network, and the like or any combination thereof. Message server 106 may be a computer system that routes incoming and outgoing messages and performs the other operations described herein. The message server 106 communicates with voice message systems 110. The voice message systems 110 may be operated as a single network and may include one or more voice message servers. Examples of such voice message servers include work voice message server 112, cellular voice message server 114 and home voice message server 116.

In this example, the message server 106 can interact with the voice message systems 110 in a manner that enables the device 102 to have access to all of the various voice messages stored on the various voice message systems 110 without requiring the user to independently access the various voice message systems.

The message server 106 can serve as a focal point of a voice message system for the device 102. In other words, the message server 106 becomes a gateway for the device 102 and the device 102 can become an inbox for all messages regardless of which voice message system initially received the voice message.

For instance, the message server 106 can fetch voice messages from the other voice message systems 110. This enables the device 102 to have access to as many as all of the user's messages. Further, the message server 106 can transmit all or a part of these messages to the device 102 without requiring the user to request the messages. A visual notification of the messages can be presented on the device 102.

The message server 106 and the device 102 work together to make messages available at the device 102 such that the user is not required to access any voice message system in order to receive his or her voice messages. According to one embodiment, the message server 106 has access to the voice message systems 110 or can pre-fetch messages from the voice message systems 110. The message server 106 can then provide the device 102 with at least a portion of each message as well as an indication of the content of each message. When a user selects a particular message, the selected message can begin to play immediately and the user is not required to browse menu systems, wait to be connected to a particular voice message system, etc. If the entire message is not actually stored on the device 102, then the device 102 can begin retrieving the rest of the message after the message is selected by the user and the segment of the message begins to play.

Although the invention is described herein in the context of a message server 106 that interacts with multiple voice message systems 110, the invention can also be practiced with a single voice message system. For example, the methods of the invention for displaying a visual representation associated with a voice message can be used to permit a user to access voice messages that are delivered through a single voice message system.

It should be understood by one of skill in the art, with the benefit of the present disclosure, that embodiments of the invention can be implemented in many types of network environments and various network architectures are applicable. For example, the message server 106 may reside in a wireless operator's network infrastructure. In another embodiment, the message server 106 resides outside the domain of a wireless operator's infrastructure, and may be hosted, for example, by an independent hosting entity, such as an application service provider. Alternately, the message server 106 can reside behind a firewall.

Figure 2A:
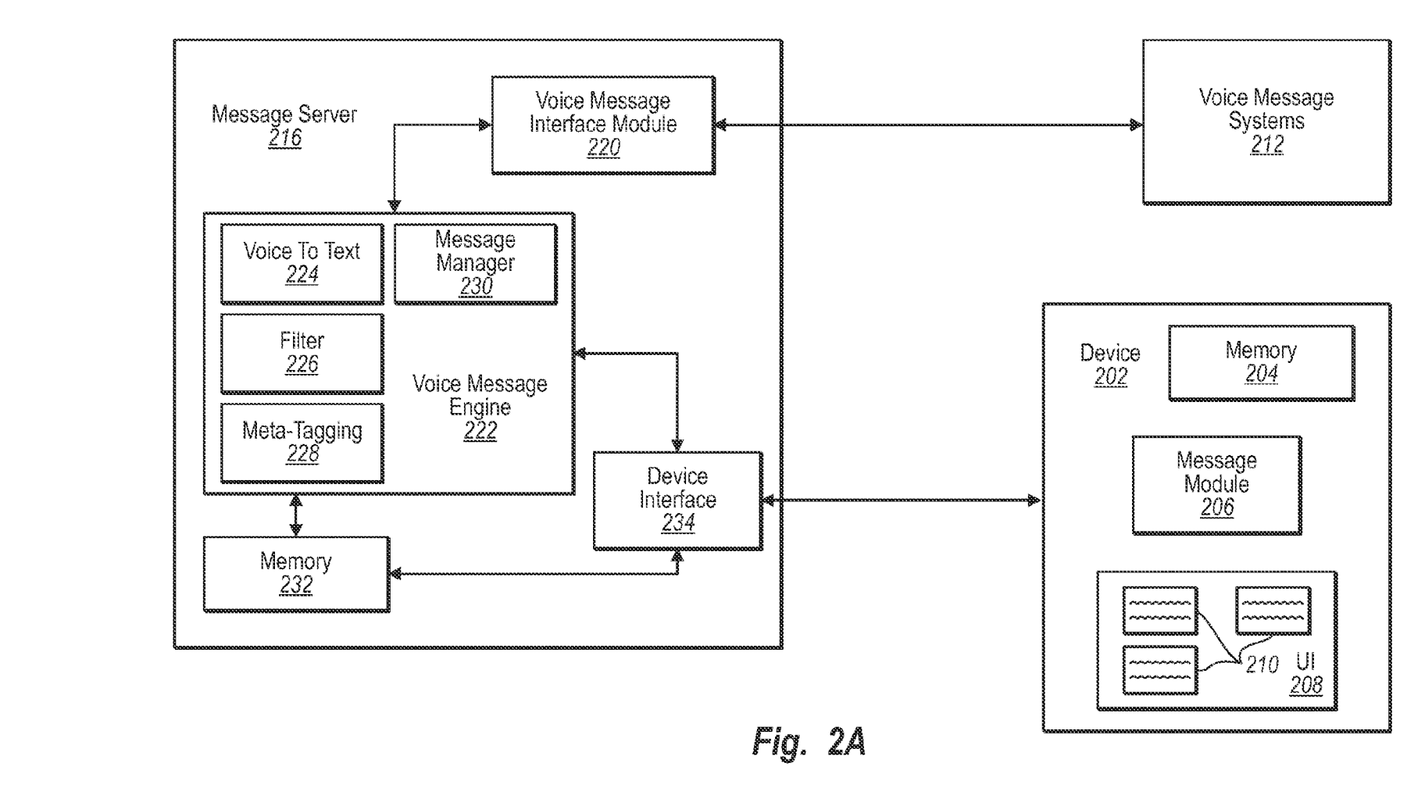
FIG. 2A illustrates one embodiment of a voice messaging system for delivering messages including voice messages.

FIG. 2A further illustrates an example of a system for managing messages including voice messages and more particularly an example of a system for delivering voice messages to a user. In this example, the user is provided with an icon, thumbnail or other visual representation of a voice message. The arrival of a new voice message can also be indicated by other means including by an audible or sensory notification. Upon user selection of the visual representation of a voice message, the device can take several actions as described below. Embodiments of the invention are described below with reference to a message server. One of skill in the art can appreciate that embodiments of the invention can also be implemented at a device level. Further, one of skill in the art can appreciate that the message server 216 can serve multiple devices or subscribers.

The message server 216 includes a voice message interface module 220 that interfaces with voice message systems 212. The user of the device 202 may provide the message server 216 with the information needed to access the voice message systems 212 of the user. The voice message interface module 220 enables the message server 216 to fetch messages or at least a portion of the messages from the voice message systems 212. In some embodiments, the voice message systems 212 can be configured to automatically forward all messages to the device 202. Forwarded messages are typically received and stored by the message server 216 in memory 232.

Once a message (or portion of the message) is received by the message server 216, the message is processed by a voice message engine 222. The filter 226, for example, may identify the source of the message, the type of the message (MMS, voice message, etc.), and other envelope information. The meta tagging module 228 may associate metadata, which describes the attributes of the voice message being received, with the voice message. For example, network identifiers, length, format, and the like are examples of metadata associated with a message.

The voice message engine 222 may also perform some voice-to-text 224 functions on the messages. The transcription provided by the voice-to-text module 224 can vary and can generate various types of output. Often the output of the voice-to-text module 224 is included in the visual notification of the message provided on the device 202. One goal of the voice-to-text module 224 is to generate text that can provide the user of the device 202 with enough information to understand what may be the subject of the associated message. For example, the voice-to-text module may generate the text of the first few seconds of the message. Alternatively, the voice-to-text module may only identify words that are translated with high confidence. The voice-to-text module 224 may transcribe a voice message according to various methodologies, including: transcribing only distinctive words; transcribing frequently occurring words; or transcribing only those words the voice-to-text engine is certain of within a specific margin of error. The voice-to-text module 224 may ignore common words such as "a" or "an" or "the", etc.

This voice transcription process performed by the voice-to-text module 224 can be further tuned by utilizing other data sources for both the transcription dictionary as well as choosing which words to use to represent the message. For example, the system can use data from the contact list of a device to help recognize names that may appear in the message, or utilize text from the user's email or other documents to choose words that are commonly used by a particular user but which are uncommon generally, such as project names, or code names, or the like.

The message server can gain access to a data source such as the contact list of a device in a number of ways. For example, a device may be configured to perform over-the-air backups of its address book to the message server. After a device user adds or edits information on the device, and the unit is on standby, a backup utility on the device may automatically transmit the data to the server. Alternatively, a user may create new contacts and edit existing ones on a website with which the message server communicates. The message server may then store the contact data and push updates to the device. In either case, the contact data is stored on the message server in addition to being stored on the device. In this manner, the message server may use data from the contact list of a device for both the transcription dictionary as well as choosing which words to use to represent the message. It should be noted that the foregoing method is given by way of example only and should in no way be construed to limit the way in which a message server may gain access to data sources for use in its transcription dictionary. Embodiments of the invention contemplate a voice-to-text module that may use both the sender's contact list and/or the recipient's contact list during the generation of the data that is included in the visual representation of the voice message displayed to the recipient.

In the previous example, a method for a message server to gain access to the contact list of a device for use in a transcription dictionary and for choosing which words to use to represent a transcribed voice message was described. One skilled in the art will recognize that in a similar manner, a message server may gain access to other data sources including: a device user's email correspondence; a device user's address book from the device user's personal computer; a device user's instant messaging correspondence; other files—such as word processing documents—stored on the user's personal computer or communication device; and the address book from a corporate directory. Additionally, it may be desirable for the message server to access data sources associated with either the sender or the recipient of a voice message, or both, for the transcription dictionary.

As previously stated, the extracted data is then used to visually represent, or is included in the visual representation of, a voice message on communication device 202. In one embodiment of the invention, a voice message is represented by a thumbnail icon 210 created with some or all of the extracted data generated by voice message engine 222, including some or all of the metadata generated by meta tagging module 228, some or all of the text generated by the voice-to-text module 224, or some combination of extracted text and metadata, or any combination thereof. For example, a thumbnail icon of a voice message might include a subject line of extracted text generated by voice-to-text module 224 and such metadata as the phone number from which the voice message originated, the length of the voice message, and the time and date the voice message was received by communication device 202. In another embodiment, if the message is from a known contact, the visual notification may also include any information known about the contact (e.g., a photo of the contact, a priority level for responding, a preferred method of response, etc.).

Visually representing a message enables a user to get an idea of what a message concerns without requiring the user to listen to the message. Also, embodiments of the invention enable a user to listen to a particular message without accessing and navigating the menus of any particular voice message system. A user can simply select a particular visual representation (such as a thumbnail), for example. The need to listen to hierarchical voice driven menus is eliminated. Furthermore, text data is searchable while audio data is not. Thus, a user unable to recall the specifics of a message could do a word search, using communication device 202 (assuming communication device 202 was configured to do searches on locally stored text files), on the extracted text of voice messages stored on communication device 202 and quickly locate a desired message without taking the time to listen to every message the user might have. Once the user has located a desired message, the user can select the thumbnail icon to begin listening to the message. Alternatively, the user can browse the thumbnail icons until the desired message is located.

In one embodiment, the message server 216 delivers a portion of each of the messages stored in the memory 232 for a particular user. The message server 216 uses the device interface 234 to deliver enough information for the message module 206 on the device to present the visual representation of a voice mail. As previously indicated, this may include some of the text of the message that is obtained from the voice-to-text module 224.

In addition, the device 202 may receive a portion or segment of the message that is stored in the memory 204 of the device (the voice message engine 222 can generate a segment for delivery to the device 202). Thus, an initial segment of the message is delivered to the device 202. The initial segment of the message may also include or be accompanied by a reference pointing back to the complete voice message stored on the message server 216. The initial segment delivered to communication device 202 includes, by way of example, the first five to ten seconds of the voice message. Generally, however, the initial segment time is chosen to optimize the user experience while minimizing device memory usage. In cases where the speed at which the network can stream the audio message is faster than the playback speed, the initial time is chosen to correspond to how long it takes the device to establish a streaming session with the server. In cases where the speed at which the network can stream is slower than the playback speed, the initial segment time is chosen to correspond to the time it takes the device to establish a communication session plus the time it takes to stream the part of the message that is not in the initial segment.

When a user decides to listen to a particular voice message in the user's inbox, (visually represented by a thumbnail icon as described above in one embodiment), the user selects the message, and playback begins almost instantly, since an initial segment of the message is already stored on communication device 202. During playback, communication device 202 establishes a connection with message server 216 and uses the stored reference to issue a request to the message server to begin transmitting the remaining selected voice message content to communication device 202.

In some instances, the segment stored by the device 202 is long enough such that the device can continue playing the message being retrieved from the message server 216 without interruption. Alternatively, the entire message may play from the beginning when retrieved from the message server 216. Thus, the segment stored on the device gives the user an idea of the content of the full message. As previously stated, however, the message selected by a user at the device may originate from one of several different voice message systems. In this case, the message server 216 can fetch the messages from these voice message systems. The visual representations of the messages delivered to the device 202 enable a user to select a specific message of any type without regard to source or without navigating any menu system.

Figure 2B:
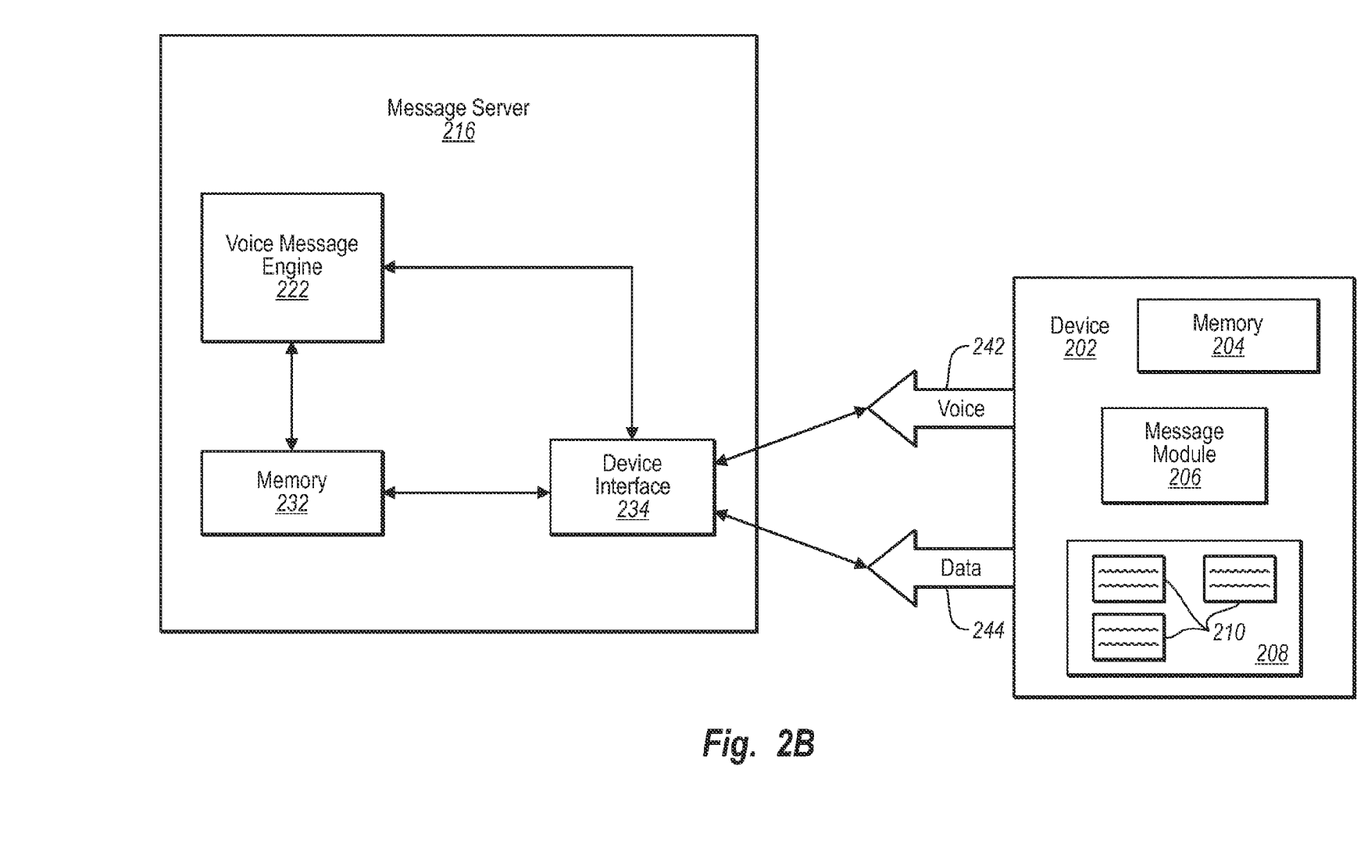
FIG. 2B illustrates different means by which a user may access voice messages visually represented on a device of the user.

FIG. 2B illustrates different ways in which a user can access voice messages. Note that with respect to FIG. 2A, identical reference numbers identify identical components. In particular, FIG. 2B illustrates a device 202 having memory 204, a message module 206 and user interface 208. The device 202 can communicate with a message server 216 over a voice channel 242 or data channel 244.

As already described, the message server delivers a reference pointing to a message stored in memory 232 or in the voice message systems 212, an initial segment of the message, the entire message and/or a visual representation of the message to the device 202. A user of the device may select a particular message for playback using a visual representation 210 of the message on the user interface 208. Once a visual representation 210 is selected, the message may be accessed in a variety of ways. For instance, if the message has been delivered in its entirety to the device 202, the device 202 may retrieve the message from memory 204 and play it for the user. If only an initial segment of the message has been delivered to the device 202, the device may retrieve the initial segment of the message from memory module 204 of the device 202, begin playback and use the reference to retrieve all or the remaining portion of the message from the message server. According to one embodiment of the invention, the message server 216 uses the voice channel 242 to convey the message (or the remaining portion thereof) to the user's device. According to another embodiment of the invention, the message server 216 conveys the message (or a remaining portion thereof) to the user's device over the data channel 244.

There may be benefits and drawbacks associated with the different types of message access means (e.g., retrieving a message resident on the device or using a voice or data channel). For instance, retrieving a message in its entirety from a device may require a significant amount of storage capacity in the memory 204 of the device 202. In contrast, retrieving a message or a remaining portion of the message from a message server over a voice or data channel does not.

There are various advantages to storing and retrieving voice messages as described herein. First, downloading an initial segment of a voice message directly to a communication device allows for instant access to the message without the typical delay associated with establishing a connection to a message server to retrieve a voice message. Additionally, because an initial segment of the voice message is stored locally on communication device 202, a user may listen to the stored portion of the message even though communication device 202 may be outside its communication network. Further, downloading only an initial segment of the voice message maximizes available storage space on a communication device thereby enabling instantaneous access to many more messages than would otherwise be possible due to the limited storage capacity of the device.

When messages or segments of messages (generally referred to as messages) are delivered to the device 202, the message module 206 may store them in the memory 204. The message module 206 can also interact with the user interface 208 to display the icons 210, which are visual representations of the messages or message segments stored in the memory 202. As previously stated, the icons 210 may include text, may be linked to specific messages or message segments, to specific text, and the like.

The message module 206 operating on the device also manages the messages stored in the memory 204. For example, the message module 206 may delete messages that are old, slowly truncate the messages over time, etc. Further, the memory 204 may be needed by a user to store outbound messages.

According to an embodiment of the invention, the longer a voice message is stored on communication device 202 and/or as additional messages are received and stored in memory 204, the more of the voice message is truncated by the message module 206. The message module 206, for example, may be configured to repeatedly truncate a voice message at specified time intervals until the voice message has been completely deleted and all that remains of the voice message is its stored reference pointing back to its backup copy on the message server or voice message server, and its associated extracted text, metadata and thumbnail icon as described above. Alternately, the message module 206 may be configured to repeatedly truncate a voice message at specified intervals until an initial segment of the voice message remains, along with its stored reference and associated extracted text, metadata and thumbnail icon. One advantage of progressively truncating voice messages stored on communication device 202 is that doing so manages available memory.

Additionally, if a user decides to listen to any particular voice message, playback of the voice message begins immediately so long as an initial segment of the voice message remains on communication device 202. Communication device 202 can then establish a connection with message server 216 during playback of the initial segment of the voice message and use the stored reference to notify message server 216 to transmit the message to the device 202.

Figure 3:
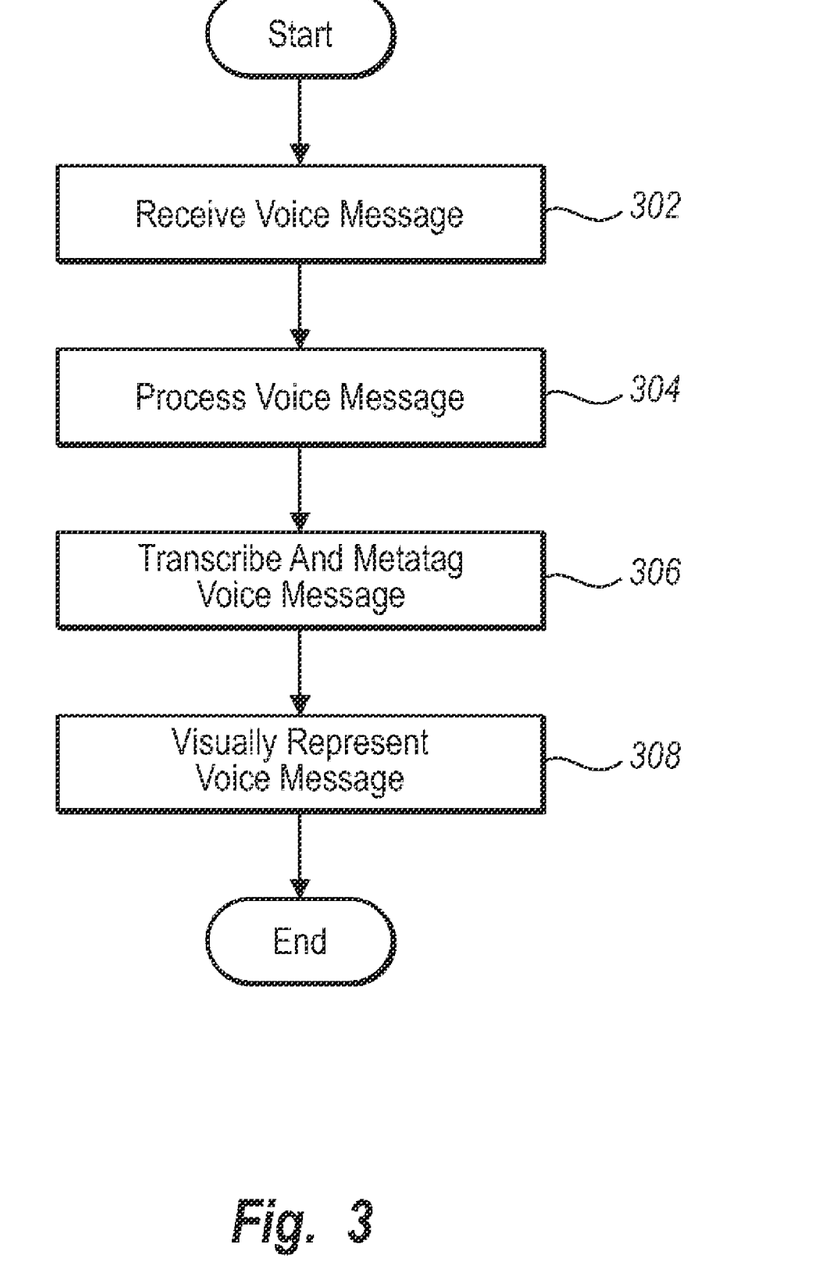
FIG. 3 is a flowchart illustrating an exemplary process for creating a visual representation of a voice message.

Turning attention now to FIG. 3, an exemplary method for delivering a voice message is illustrated. The process often begins by receiving 302 a voice message. The voice message can be received at any voice message system or at the message server. When the voice message is received at a specific voice mail system, that system may be configured to forward the voice message to the message server or the message server may fetch the voice messages automatically.

Next, the message server processes 304 the voice message. This may include, by way of example, performing 306 voice-to-text conversion on at least a portion of the message, identifying metadata 306, storing the message in memory and the like or any combination thereof. Then, the message server can send 308 data to the device of the intended recipient such that the device of the recipient can visually represent the message. As previously stated, the data sent to the device may include the entire voice message, a segment of the voice message, some or all of the transcribed text of the message, envelope information, contact information, and the like or any combination thereof. The device can then display an icon or other visual representation that conveys at least some of the data visually to the recipient. For example, the visual notification may include the name or number of the sender of the voice message as well as some of the transcribed message content. The visual representation of the voice message may include enough information to convey an idea of the content of the voice message to the recipient. Further, the recipient can listen to the voice message without having to navigate a voice mail menu system. Selecting the visual representation results in the full message being played for the recipient at the device.

Figure 4:
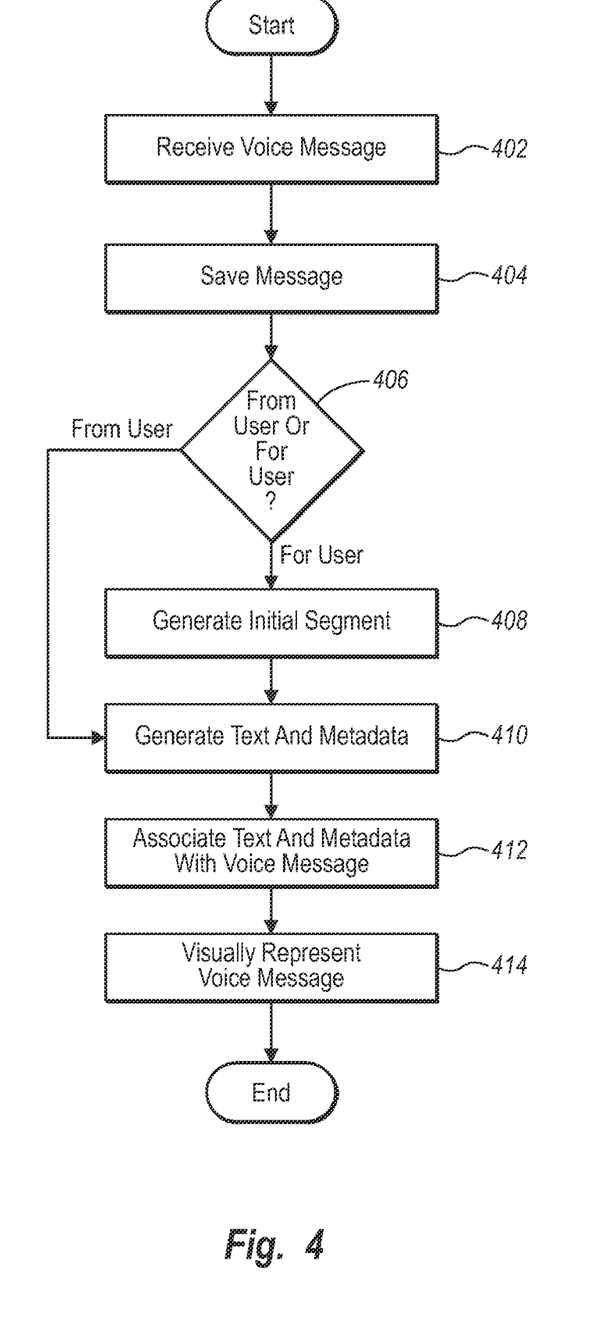
FIG. 4 illustrates another method for delivering voice messages that provides a visual representation of each voice message.

FIG. 4 is a flowchart representing with more detail a method for practicing the invention. FIG. 4 further illustrates that a device, in addition to serving as an inbox, can also function as an outbox for outgoing messages. In this case, the message server receives a voice message 402 originating from a device user. For instance, the user may be sending an instant voice message (referred to herein as a vnote) from the user's device. The vnote is recorded at the user's device and then sent through the message server to a recipient device without requiring the user to call the recipient. Alternatively, the message server may receive a voice message 402 such as a voicemail message intended for the device user from the voice message systems or from another user. In either case, the message server saves 404 the message.

If the message is a vnote or other voice message for the user 406, then the message server can generate 408 an initial segment of the message. In both cases, whether the message is sent from the user or to the user, the message server can generate 410 text and metadata and associate 412 the text and the metadata with the voice message. Alternatively, the message server generates the data needed to visually represent the voice message and enable the device to access the entire message when the visual representation is selected at the device. Finally, the voice message is visually represented 414 (as a thumbnail, icon, or other visual representation) to the user at the user's device and can be accessed as described herein. The process illustrated at FIG. 4 can be performed at a message server, at the user's device, or at a combination thereof.

For incoming messages, the process is often performed at the message server. More particularly, the message server processes the voice messages sent to a user and generates data that can be used to visually display the voice messages on the user's device. The message server, for example, may generate an icon for display on the user's device that identifies a particular message. The icon may be accompanied by a reference to the full message. When the user selects a particular icon or visual representation of a voice message, then the corresponding message is retrieved from the message server and delivered in full to the user's device. When the message is an outgoing vnote, then the message may first be recorded on the device and then sent to the message server for processing. Alternatively, the user may directly record the vnote at the message server.

Figure 5:
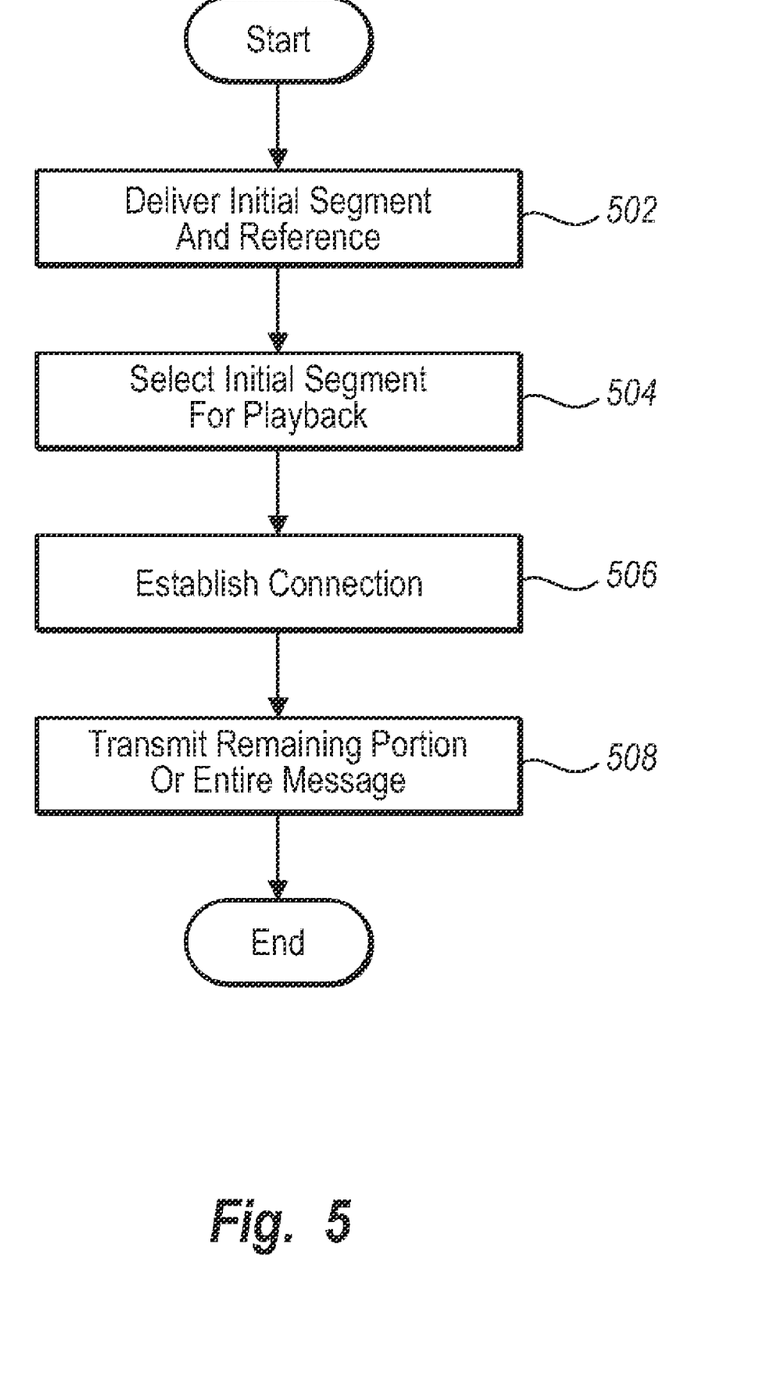
FIG. 5 is a flowchart illustrating a method for immediate retrieval of voice messages on a communication device.

FIG. 5 illustrates a method for retrieving a voice message with a communication device. In this case, the message server delivers 502 an initial segment of a voice message and a reference or other message identifier to the user's device, which receives the segment. The delivery of the segment may be accomplished by the message server first sending a notification (i.e., SMS notification, WAP push, HTTP push, or other push protocol) to the communication device and the communication device automatically retrieving the initial segment and reference while the communication device is within the wireless communication network. Alternatively, the device may retrieve message segments periodically or whenever within range of an appropriate network.

Using the information received from the message server, the device then displays a visual representation of each voice message. The user then selects 504 for playback an initial segment of a voice message previously delivered to and stored on the communication device. Because an initial segment of a voice message is stored on the communication device itself, playback begins almost instantly without waiting to establish a network connection with the message server.

Meanwhile, the device establishes 506 a network connection with the message server while the user is listening to the initial segment of the voice message. The message server then transmits 508 the entire message to the device for playback or transmits the remaining portion of the message for playback. The reference or identifier associated with the message segment can be used by the message server to identify the appropriate message stored at the message server. The device may have the ability to begin playing the message at the point where the initial segment ends. In this manner, it appears that the entire message is stored at the device. Alternatively, the message can begin playing as soon as it is received from the device in its entirety. In either case, any delay experienced by the user is minimized and is much less than is experienced when a user is required to access a voice message by dialing in to a particular voice mail system and navigating menus to reach a new message.

Further, the device typically manages its memory to accommodate future messages and to accommodate a large number of messages. By storing only a segment of each message, the number of messages that appear to be physically stored on the device is larger than what is possible when the complete messages are fully stored on the device.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A server-implemented method for delivering messages comprising:
   removing a portion of a voice message to create a truncated version of the voice message;
   sending to a mobile telephone the truncated version of the voice message and a reference pointing to the complete voice message stored on a message server, wherein the mobile telephone is configured to locally store the truncated version of the voice message and the reference to the complete voice message stored on the message server such that a user of the mobile telephone may select the voice message for playback in any order without regard to the order in which the truncated version of the voice message or other messages may have been received;
   receiving, from the mobile telephone, a request for at least the portion of the voice message, the request including the reference to the complete voice message;
   wherein the mobile telephone, in response to receiving user input indicating that the voice message should be played:

commences playing the locally stored truncated version of the voice message;
during playback of the locally stored truncated version of the voice message, establishes a connection with the message server; and
during the playing of the locally stored truncated version of the voice message, sends the request for at least the end portion of the voice message; and
in response to receiving the request from the mobile telephone, sending at least the portion of the voice message to the recipient device, wherein the mobile telephone is further configured to continue to play without interruption the portion of the voice message after playing the stored truncated version of the voice message such that the entire voice message is played without interruption.

2. A system for delivering messages comprising:
at least one server configured to perform a method comprising:
removing a portion of a voice message to create a truncated version of the voice message;
sending to a mobile telephone the truncated version of the voice message and a reference pointing to the complete voice message stored on a message server, wherein the mobile telephone is configured to locally store the truncated version of the voice message and the reference to the complete voice message stored on the message server;
receiving, from the mobile telephone, a request for at least the portion of the voice message, the request including the reference to the complete voice message;
wherein the mobile telephone, in response to receiving user input indicating that the voice message should be played:
commences playing the locally stored truncated version of the voice message;
during playback of the locally stored truncated version of the voice message, establishes a connection with the message server; and
during the playing of the locally stored truncated version of the voice message, sends the request for at least the end portion of the voice message; and
in response receiving the request from the mobile telephone, sending at least the portion of the voice message to the recipient device, wherein the mobile telephone is further configured to continue to play without interruption the portion of the voice message after playing the truncated version of the voice message such that the entire voice message is played without interruption.

3. A server-implemented method for delivering messages comprising:
sending to a mobile telephone a truncated version of a voice message and a reference pointing to the complete voice message stored on a message server, wherein the mobile telephone is configured to locally store the truncated version of the voice message and the reference to the complete voice message stored on the message server;
receiving, from the mobile telephone, a request for at least a portion of the voice message, the request including the reference to the complete voice message;
wherein the mobile telephone, in response to receiving user input indicating that the voice message should be played:
commences playing the locally stored truncated version of the voice message;
during playback of the locally stored truncated version of the voice message, establishes a connection with the message server; and
during the playing of the locally stored truncated version of the voice message, sends the request for at least the end portion of the voice message; and
in response to receiving the request from the mobile telephone, sending at least the portion of the voice message to the recipient device, wherein the mobile telephone is further configured to automatically play without interruption the entire message including the portion after playing the truncated version of the voice message.

4. A messaging method performed within a mobile telephone, the method comprising:
receiving a truncated version of a voice message and a reference pointing to a complete version of the voice message stored on a message server;
locally storing the truncated version of the voice message and the reference to the complete version of the voice message stored on the message server
receiving user input indicating that the voice message should be played;
in response to receiving the user input indicating that the voice message should be played:
playing the locally stored truncated version of the voice message;
during playing the locally stored truncated version of the voice message, sending, to a server, a request for at least a portion of the voice message, the request including the reference to the complete voice message;
receiving, from the server, at least the portion of the voice message; and
automatically playing without interruption the portion after playing the truncated version of the voice message such that the entire voice message is played without interruption.

5. A system for delivering messages comprising:
at least one server configured to perform a method comprising:
sending to a mobile telephone a truncated version of a voice message and a reference pointing to a complete version of the voice message stored on a message server,—wherein the mobile telephone is configured to locally store the truncated version of the voice message and the reference to the complete version of the voice message stored on the message server;
receiving, from the mobile telephone, a request for at least a portion of the voice message, the request including the reference to the complete voice message;
wherein the mobile telephone, in response to receiving user input indicating that the voice message should be played:
commences playing the locally stored truncated version of the voice message;
during playback of the locally stored truncated version of the voice message, establishes a connection with the message server; and
during the playing of the locally stored truncated version of the voice message, sends the request for at least the portion of the voice message; and
in response receiving the request from the mobile telephone, sending at least the portion of the voice message to the recipient device, wherein the mobile telephone is further configured to automatically play without interruption the portion after playing the truncated version of the voice message such that the entire voice message is played without interruption.

6. A messaging system comprising:

a mobile telephone configured to:

receive a truncated version of a voice message and a reference pointing to a complete version of the voice message stored on a message server;

locally store the truncated version of the voice message and the reference to the complete version of the voice message stored on the message server;

receive user input indicating that the voice message should be played;

in response to receiving the user input indicating that the voice message should be played:

play the locally stored truncated version of the voice message;

during playing the locally stored truncated version of the voice message, send, to a server, a request for at least a portion of the voice message, the request including the reference to the complete voice message;

receiving, from the server, at least the portion of the voice message; and automatically play without interruption the portion after playing the truncated version of the voice message such that the entire voice message is played without interruption.

* * * * *